United States Patent
Pesnell et al.

(10) Patent No.: US 7,008,231 B2
(45) Date of Patent: Mar. 7, 2006

(54) CATCHING TRAINING APPARATUS

(76) Inventors: Patrick Pesnell, 20 Lenon Dr., Little Rock, AR (US) 72205; Glenn Erskine, 1008 Sierra Vista Dr., Granbury, TX (US) 76048

(*) Notice: Subject to any disclaimer, the term of this patent is extended or adjusted under 35 U.S.C. 154(b) by 456 days.

(21) Appl. No.: 10/263,180

(22) Filed: Oct. 3, 2002

(65) Prior Publication Data
US 2003/0138761 A1    Jul. 24, 2003

Related U.S. Application Data

(60) Provisional application No. 60/349,966, filed on Jan. 23, 2002.

(51) Int. Cl.
 *G09B 9/00* (2006.01)
 *G09B 19/00* (2006.01)
(52) U.S. Cl. ............. 434/247; 434/258; 434/365; 345/156; 600/595; 482/900
(58) Field of Classification Search ........... 434/114, 434/247–249, 252, 258, 307 R, 365; 73/172; 414/5; 473/202, 205, 212, 213; 482/4, 900; 345/156–158, 161; 310/323.21; 600/592, 600/595; 623/24, 25, 57; 606/139
See application file for complete search history.

(56) References Cited

U.S. PATENT DOCUMENTS

| 4,302,138 A | * | 11/1981 | Zarudiansky ................ 414/5 |
| 5,389,849 A | * | 2/1995 | Asano et al. .......... 310/323.21 |
| 5,413,611 A | * | 5/1995 | Haslam et al. ................ 623/25 |
| 5,720,200 A | * | 2/1998 | Anderson et al. ............. 73/172 |
| 5,778,885 A | * | 7/1998 | Doyama et al. ............ 600/595 |
| 5,855,583 A | * | 1/1999 | Wang et al. ................ 606/139 |
| 5,945,978 A | * | 8/1999 | Holmes ...................... 345/157 |
| 6,049,327 A | * | 4/2000 | Walker et al. .............. 345/158 |
| 6,072,466 A | * | 6/2000 | Shah et al. ................. 345/156 |
| 6,184,868 B1 | * | 2/2001 | Shahoian et al. ........... 345/161 |
| 6,310,604 B1 | * | 10/2001 | Furusho et al. ............. 345/156 |

* cited by examiner

*Primary Examiner*—Joe H. Cheng
(74) *Attorney, Agent, or Firm*—Joe D. Calhoun

(57) ABSTRACT

A glove for assisting the user to catch a thrown object with fingers rather than palms, including pressure sensors installed in the palm area of typical receiver gloves (providing a voltage trigger signal used to latch an indicator LED informing the athlete of palm contact, together with flex sensors in the fingers deactivating the palm pressure sensor when at least one of the user's fingers is flexed inwardly toward the palm (preventing an inadvertent palm pressure trigger signal from locking in the LED prior to a catch attempt). This allows the athlete to run with fists closed without latching the palm pressure indicator, then to open his or her hands, thereby enabling the latch circuit for the catch.

20 Claims, 6 Drawing Sheets

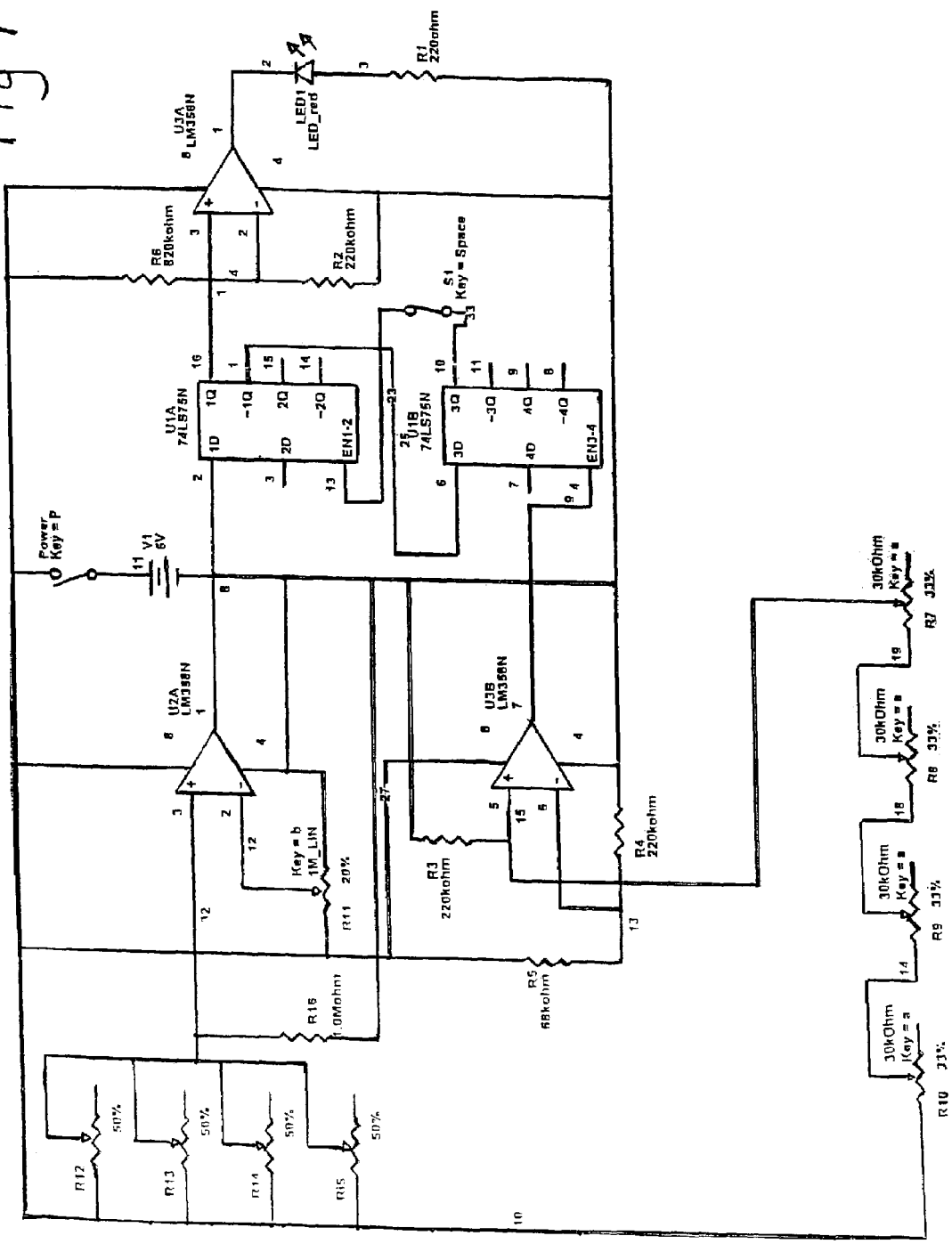

CATCHING TRAINING APPARATUS

(B) CROSS REFERENCES TO RELATED APPLICATIONS

This application claims priority from U.S. provisional application, Ser. No. 60/349,966 filed on 23 Jan. 2002, the disclosure of which is incorporated herein by reference in its entirety.

(C) FEDERALLY SPONSORED RESEARCH OR DEVELOPMENT

Not applicable.

(D) MICROFICHE APPENDIX

Not applicable.

(E) BACKGROUND OF THE INVENTION (1) Field of the Invention

The invention disclosed herein generally relates to the field of athletic teaching devices. More particularly, the present invention relates to devices for training techniques for catching a thrown ball with fingertips rather than palms.

The world of competitive sports is becoming more and more of a business than a game. It has evolved into a multi-billion dollar industry with players' contracts reaching as high as one quarter of a billion dollars and television rights costing billions of dollars. With the growth of this industry, the demand for performance enhancement tools has grown dramatically.

The present invention is intended for use primarily by football and basketball players as a training aid to enhance the ability of a receiver to catch a thrown ball. It is essentially a glove with a wrist extension, that can be worn by the athlete. The invention is designed to develop the "crab" technique of ball reception, requiring the ball to be caught by squeezing it with the fingertips similar to the way a crab uses its claws to grasp food. In this technique, the ball is caught with the fingers, and should never touch the palms of the hands during reception.

(2) Description of the Related Art Including Information Disclosed Under 37 C.F.R. 1.97 and 1.98.

Unlike activities wherein it is desirable or advantageous to maintain a high level of grip pressure on an implement, many sports and other activities place a premium on grasping or controlling an item with fingers or fingertips. For instance, in the sport of football, conventional wisdom indicates that receivers should develop skills for catching thrown footballs with their fingers or fingertips rather than with their palms; such techniques enable receivers to extend their vertical and lateral reach for receiving passes, and otherwise increase their dexterity in retrieving thrown footballs. Similarly, conventional wisdom indicates that basketball players should develop their skills for catching, dribbling and shooting basketballs more with their fingers and fingertips than with their palms. However, although allowing the ball to contact the palm is discouraged, an athlete's fingertips often contact the palm as a normal incident of running or playing a sport.

Known in the art are various types of gloves for assisting the user to correctly learn or practice different activities, especially sports involving the gripping of an implement by a handle. Common examples include gloves intended to be worn by golfers or baseball batters. Almost all such technique-training gloves provide an indication when the user loosens his or her grip upon the handle.

The following patents are arguably related to the patentability of the subject invention:

| U.S. Pat. No. | 1st Inventor | Date |
| --- | --- | --- |
| 6,126,572 | Smith | Oct. 3, 2000 |
| 6,016,103 | Leavitt | Jan. 18, 2000 |
| 6,006,358 | Keating | Dec. 28, 1999 |
| 5,771,492 | Cozza | Jun. 30, 1998 |
| 5,733,201 | Caldell et al | Mar. 31, 1998 |
| 5,655,223 | Cozza | Aug. 12, 1997 |
| 5,509,809 | Clay | Apr. 23, 1996 |
| 4,488,726 | Murray | Dec. 18, 1984 |

U.S. Pat. No. 5,771,492 issued to Cozza discloses a golf training glove signaling a failure to maintain proper grip pressure about the golf club during the swing. The glove includes a pressure-responsive sensor on the knuckle of the thumb, another pressure sensor on the palm, and a pressure sensor on the knuckle of the little finger. Grip pressure is desirable, gauged primarily by pressure exerted on the palm while the club is grasped therein. The sensor on the little finger, normally inactivated before the user grips the club, is activated (closed-circuit) when the little finger is properly bent around the golf club. The other sensors are empowered when sufficient pressure closes a circuit normally separated by insulation. A signal is emitted if the sensor on the little finger indicates lack of bending, or if one of the other sensors indicate insufficient grip pressure. Rather than disclosing means for bypassing the palm pressure sensors when the little finger is bent inwardly toward the palm, Cozza discloses just the opposite; lack of bending triggers an alarm.

U.S. Pat. No. 4,488,726 issued to Murray discloses a sports practice glove comprising several pressure-operated switches arranged on the inside gripping surface (such as the thumb, fingertips and palm), plus an alarm actuated when pressure on any of the switches falls below a predetermined threshold for gripping a club, racket or bat. The switches are normally closed; when the gloved hand properly grips a sports implement, all switches are held open until pressure against a switch falls below a threshold.

U.S. Pat. No. 6,126,572 issued to Smith discloses an apparatus for monitoring and displaying pressure data obtained while the wearer is engaged in physical exercise, especially isometric exercise. This type of exercise essentially occurs as one part of the body (with associated muscles) exerts pressure against another part of the body opposing such pressure, thereby exercising the body; the amount of pressure being exerted, and the change in pressure, is a measure of the amount of exercise being performed. Disclosed is an apparatus comprising a pressure-change sensor (providing a signal reflecting the amount of pressure change), a monitor that processes that signal into a display signal, and a display that produces a visualization of the pressure change. The apparatus can be integrated into a glove, with pressure sensors on the palm or other points of interest. This patent does not disclose any means for bypassing the triggering of a signal unintentionally resulting from alternative pressure(s) that are deemed acceptable.

The present invention is intended to train for lack of palm pressure, whereas the other inventions dealing with pressure encourage such pressure. The present invention also includes a way of avoiding "false alarms", by including finger flexion means for bypassing the triggering of a palm-pressure signal unintentionally resulting from the flexing of fingers against the palm (as when running with fists closed).

(F) BRIEF SUMMARY OF THE INVENTION

One general version of the invention disclosed herein includes (comprises) means for sensing pressure on a palm, and means for bypassing such pressure sensing means when such pressure is attributable to fingers are bent or curled inwardly toward the palm.

The invention is designed to provide feedback after each catch, to indicate if the ball has improperly contacted the palm of a hand. One or more pressure sensors are installed in the palm area of typical receiver gloves, to provide a voltage trigger signal used to latch an indicator LED informing the athlete of palm contact. The LED is reset before the next catch attempt is made, by pressing a button mounted on the circuit housing. The glove is also fitted with flex sensors in the fingers, that are used to prevent an inadvertent palm pressure trigger signal from locking in the LED prior to a catch attempt. Specifically, this allows the athlete to run with fists closed without latching the indicator, then to open his or her hands, thereby enabling the latch circuit for the catch.

One primary object of the present invention is to provide a catching training apparatus encouraging catching with fingers or fingertips rather than the palms.

Another primary object of the present invention is to provide a catching training apparatus that will function despite palm contact by fingertips occurring as a normal incident to the user's activity.

Another object of the invention is to provide a catching training apparatus having construction that is relatively rugged and resistant to sweat or water.

Another object of the invention is to provide a catching training apparatus that is relatively easy to manufacture.

Another object of the invention is to provide a catching training apparatus that is relatively inexpensive to manufacture.

Another object of the invention is to provide a catching training apparatus that is relatively easy to operate.

Other objects will be apparent from a reading of the written description disclosed herein, together with the claims.

(G) BRIEF DESCRIPTION OF THE SEVERAL VIEWS OF THE DRAWINGS

FIG. 1 is a palm-side plan view of one version of the invention as worn by a user, palm open with the outer layer of fabric removed to expose a plurality of palm pressure sensors such as 101, 102, 103 and 104, including each respective lead terminating in a respective connector end (not shown); note that all connector ends converge at least immediately before entry into the housing on the wrist-back portion of the invention, not shown.

FIG. 2 is a back-hand plan view of the invention of FIG. 1 depicting a processor housing (201) atop the wrist-back portion of the invention; the sensor leads (not shown) enter the housing and connect with the invention circuitry (not shown) within the housing; the housing includes a central LED display window (202) and a circumferential on/off switch (203); it may also include a circumferential reset switch (204) or a circumferential switch for entering alternative operational modes (205) such as (for example) automatic shut off, automatic power save, automatic reset after catch, or automatic save for memory of pressure triggered signals.

FIG. 7 is a schematic diagram of one version of the invention.

Figure 1:
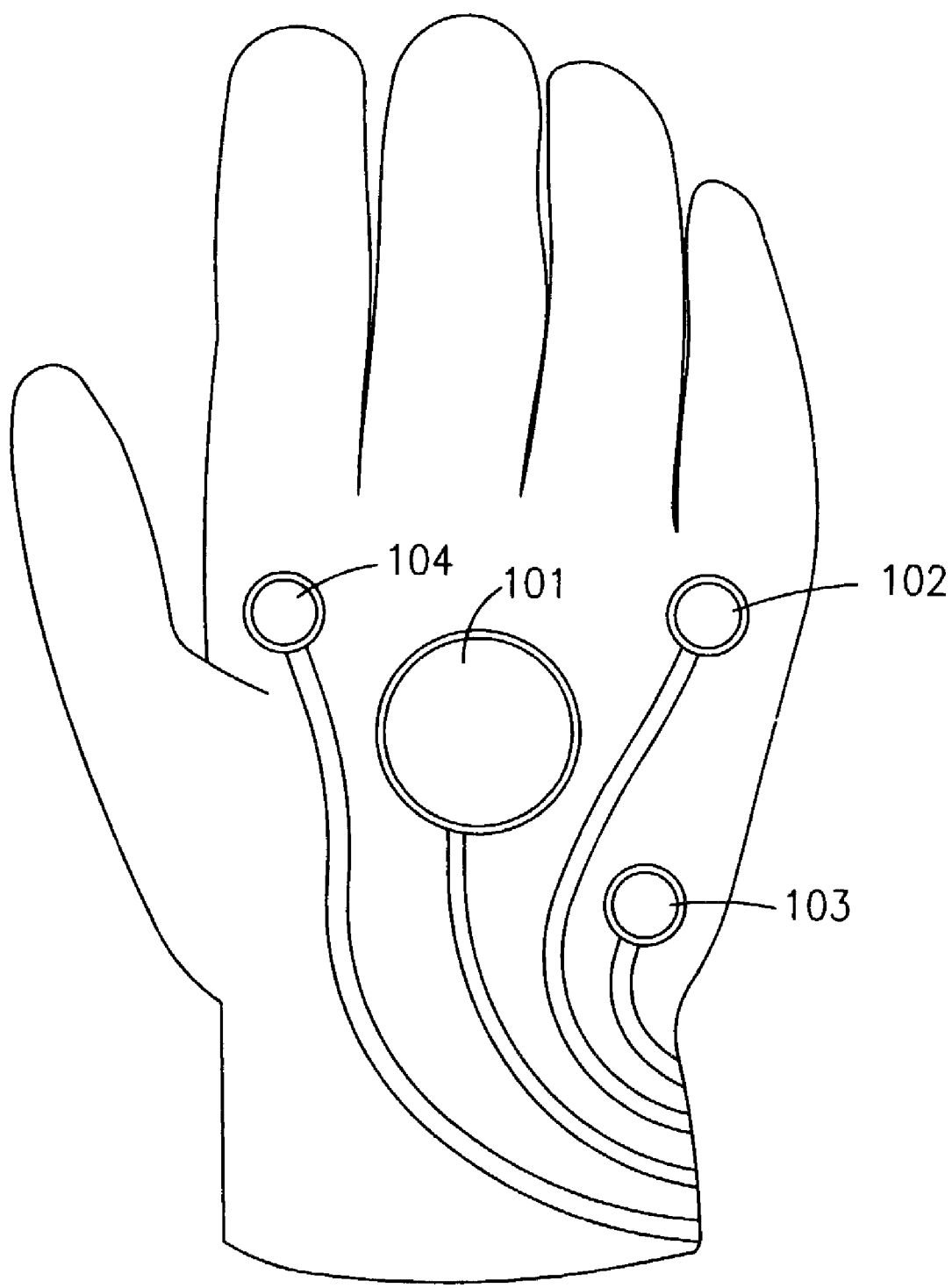
Figure 3:
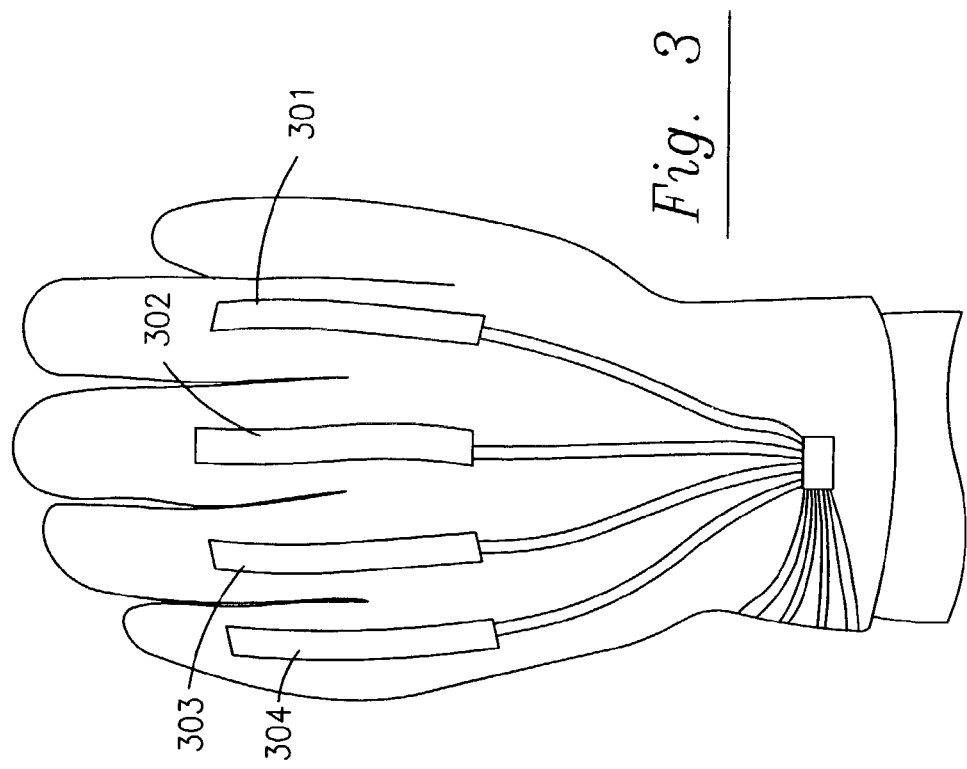
FIG. 3 is a cutaway view of the invention of FIG. 2, with the outermost layer of material removed to expose a plurality of finger flexion sensors such as 301, 302, 303 and 304, including each respective lead terminating in a respective connector end; note that all connector ends converge at least immediately before entry into the housing on the outer wrist-back portion of the invention, not shown.
Figure 2:
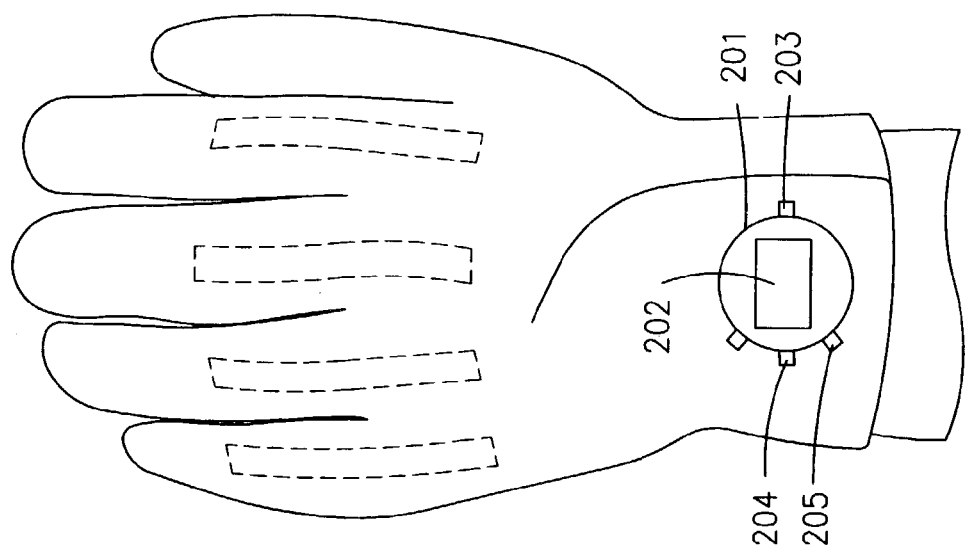
Figure 4:
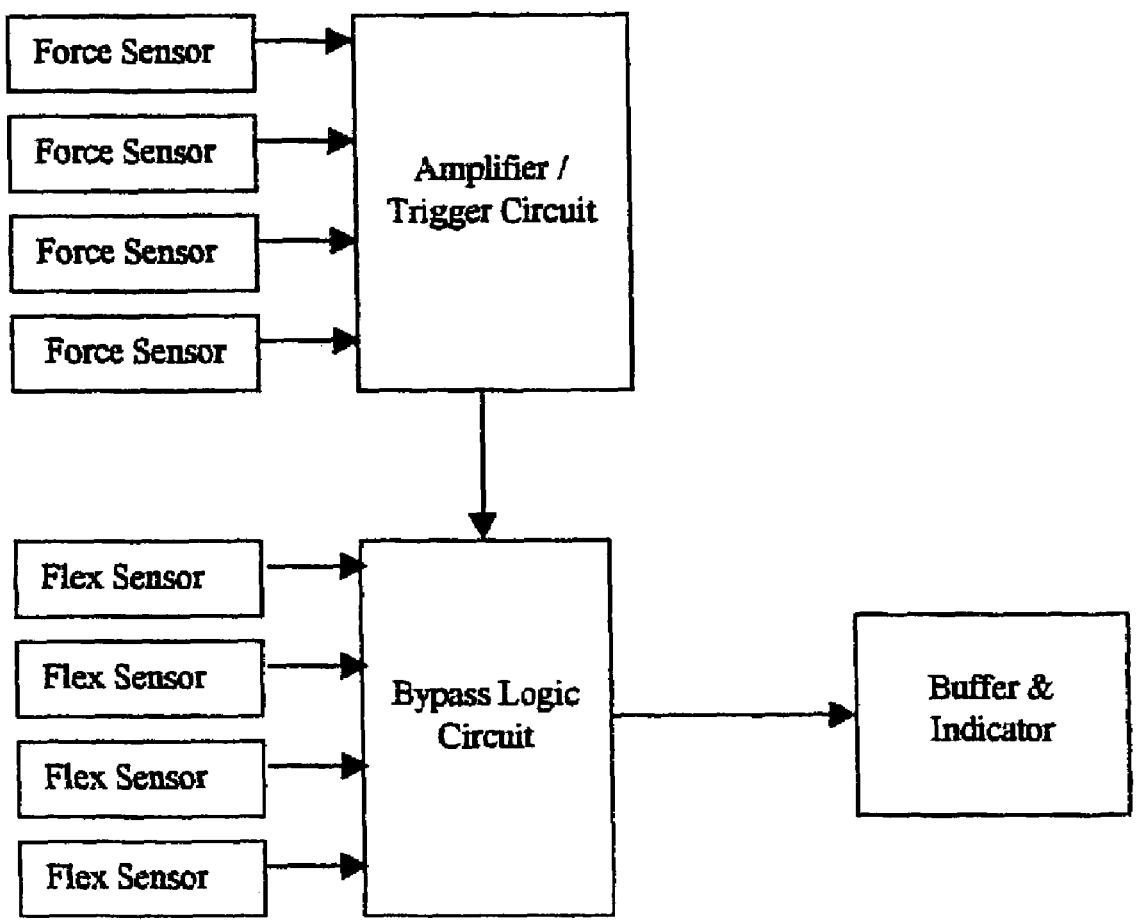
FIG. 4 is a block diagram of the circuit logic of one version of the invention.

These drawings illustrate certain details of certain embodiments. However, the invention disclosed herein is not limited to only the embodiments so illustrated. The invention disclosed herein may have equally effective or legally equivalent embodiments.

(H) DETAILED DESCRIPTION OF THE INVENTION

For the sake of simplicity and to give the claims of this patent application the broadest interpretation and construction possible, the following definitions will apply.

1. The word "activate" or derivative thereof means completing the conductivity of a material sufficient to allow for transmission of electricity through that portion of a circuit not yet completely closed; the word "empower" or derivative thereof means to endow with power such as (for example) through the transmission of electricity along a completely closed electrical circuit to an indicator means.
2. The word "comparator" or derivative thereof means an operational amplifier comparator or analogous component capable of receiving variable input and outputting same as one of two desired output levels, depending upon the level of input received.
3. The word "enable" or derivative thereof means to support intended functioning such as (for example) enabling an electrical circuit or switch thereof to bypass a palm pressure sensor circuit; conversely, the word "disable" or derivative thereof means to prevent from further intended functioning.
4. The word "input" or derivative thereof means electrical current or a logic directive received into or by the referenced component, or the act of putting same into the referenced component.
5. The word "output" or derivative thereof means electrical current or a logic directive exiting out of the referenced component, or the act of exiting same from the referenced component.
6. The term "switch" or derivative thereof means a component capable of receiving variable input and closing or activating an electrical circuit (or continuing same) or opening or deactivating an electrical circuit (or continuing same) depending upon the input received (such as, for example, a flip-flop or latch device), or the act of accomplishing same.

Also for the sake of simplicity, the conjunctive "and" in the written description may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural or functional requirements. For example, any material may be used so long as it satisfies the function for which it is being used, such as sensing palm pressure or finger flexion. Materials for a palm pressure sensor may include any of the following, or possibly combinations thereof: normally inactivated (open circuit) when unpressured mechanical pressure-sensitive switches, proximity switches, capacitance switches. Materials for a finger flexion sensor may include any of the following, or possibly combinations thereof: normally activated (closed circuit) when unflexed mechanical pressure-sensitive switches, proximity switches, capacitance switches.

Although the invention has a number of features and variations, its most general form includes (comprises) an apparatus for training the user to catch an object with fingers rather than palms, including a means for sensing palm pressure exerted against the user's palm, a means for bypassing said palm pressure sensing means when at least one of the user's fingers is flexed sufficiently inwardly toward the palm to cause exertion of pressure thereon, and a means for indicating when non-bypassed palm pressure occurs (not shown).

Said bypass means may include a finger flex sensor means. More particularly, said finger flex sensor means may include electrical circuitry initially activated until finger flexion exceeding a desired level is sensed by said finger flex sensor means.

Even more specifically, said finger flex sensor means may include a flexible unflexed-activated circuit of ink, the flexing of which causing sufficient dispersion of said ink to reduce said activation below a desired level. Said finger flex sensor means may include a layer of flexible insulative material having a circuit of electrically conductive ink (not shown), the flexing of which causing sufficient dispersion of said ink to reduce said electrical current; said finger flex sensor means disables said bypass switch (not shown) upon finger flexion beyond a desired level.

Another version of the finger flex sensor means may include initially-activated circuitry extending from an electrical power source (not shown) along said finger flex sensor, through a comparator, and through a bypass switch juncture (not shown) capable of deactivating a palm pressure sensor circuit between said palm pressure sensing means and said indicator means. More particularly, said electrical power source inputs about 6 volts of electrical current into said finger flex sensor which, when flexed at least a desired flexion amount, reduces output to below 3.7 volts into said comparator, which outputs no significant voltage into said bypass switch thereby deactivating said palm pressure sensing circuit.

The palm pressure sensing means may include an initially-deactivated palm pressure sensor that activates upon the application of pressure. More particularly, said palm pressure sensor may include two layers of conductive material separated by pressure sensitive electrically insulative material, the palm pressure causing said insulative material to disperse and cause increased conductivity. The conductive material may include silver. The insulative material may include pressure sensitive ink (not shown).

Another version of the palm pressure sensor means may include initially-deactivated circuitry extending from said electrical power source along said palm pressure sensor, through a comparator, through said bypass switch juncture, and to said indicator means. More particularly, said electrical power source inputs about 6 volts of electrical current into said initially-deactivated palm pressure sensor which, when pressured at least a desired pressure amount, activates output of about 4.5 volts into said comparator, which outputs about 4.7 volts into said bypass switch juncture which, if enabled, outputs about 4.7 volts to said indicator means.

The indicator means may include an LED display empowered by input from said palm pressure sensor circuit. The invention may also include means for automatically reducing operational power availability to the extent not required for use. Such means may include electrical circuitry and logic programming (including any necessary computer hardware and/or software programming). Similarly, the invention may include means for automatically resetting (not shown) said apparatus after a desired duration following each LED empowerment, or means for remembering the number of LED empowerments in each successive duration of use.

One specific embodiment of the apparatus for training the user to catch an object with fingers rather than palms, may include:

1. means for sensing pressure exerted against the user's palm, may include a palm pressure sensor circuit may include initially-deactivated circuitry extending from an electrical power source along a palm pressure sensor may include two layers of conductive material separated by pressure sensitive electrically insulative material, said circuitry continuing through a comparator, through a bypass switch juncture capable of deactivating said palm pressure sensor circuit, and to means for indicating when non-bypassed palm pressure occurs; and 2. means for deactivating said palm pressure sensor circuit, said deactivating means may include initially-activated circuitry extending from said electrical power source along a finger flex sensor means may include a layer of flexible insulative material having a circuit of electrically conductive ink, said circuitry continuing through a comparator, and through said bypass switch juncture.

The bypass circuit may function in many ways. One embodiment comprises one or more finger flex sensors in electrical connection with a comparator, which in turn is in electrical connection with a switch having an enable/disable capability. The switch joins the palm pressure sensor circuit upstream of the LED display; the bypass circuit's enabling activation of the juncture completes the palm pressure sensor circuit, thereby allowing triggering of the LED display to signal discouraged palm pressure (with finger's un-flexed) if such discouraged condition exists.

In one embodiment, the invention's power source supplies approximately six (6) voltage electricity to the finger flex sensor input. When the finger (and related finger flex sensor) is essentially straight (or not flexed at least about 90°), the conductivity of the sensor outputs approximately 4.2 voltage electrical current into the comparator, which in turn outputs about 4.72 volts of current into the switch; the switch outputs that same current, thereby activating the palm pressure circuit and enabling the palm pressure circuit to continue operation downstream of the juncture.

By contrast, when the finger flex sensor flexes from the straight position to about 90° or more flexion, the output voltage decreases to about 3.7 volts for inputting into the comparator, which accordingly outputs zero (0.0) volts into the switch; the loss of switch output is essentially a disabling signal, deactivating the juncture with the palm pressure circuit, disabling the palm pressure circuit from operation downstream of the juncture.

With respect to the palm pressure circuit of this embodiment, the invention's power source supplies approximately six (6) voltage electricity to the palm pressure sensor(s) input. When there is no pressure on the palm (and related palm pressure sensor), the conductivity of the sensor outputs zero (0.0) volts into a comparator, which in turns outputs zero (0.0) volts to the juncture switch; zero (0.0) volts is provided to the LED display, regardless of whether the juncture is activated (enabled) or deactivated (disabled). By contrast, pressure on the palm (and related palm pressure sensor) causes the palm pressure sensor to output about 4.5 voltage electrical current into the comparator, which in turn outputs about 4.72 volts of current into the juncture switch. If the juncture switch is enabled (due to electrical current indicative of straight fingers) about the same current is inputted into the LED display to signal discouraged palm pressure (with fingers unflexed). If the palm pressure is accompanied by current from the bypass circuit indicative of sufficient finger flexion, the bypass circuit disables the juncture switch and thereby prevents the empowerment of a "false positive" signal on the LED display.

The LED display may remain energized until reset. Alternatively, the invention may include logic circuitry for an automatic reset after catch, or automatic save for memory of pressure triggered signals. The invention may also include logic cuitry for automatic shut off or automatic power save modes of operation.

EXAMPLE 1

The palm pressure sensors regularly provide a voltage trigger signal proportional to the contact force. The trigger signal is used to latch an indicator LED informing the athlete of palm contact. The LED is reset before the next catch attempt is made, by pressing a button mounted on the circuit housing. The glove is also fitted with flex sensors in the fingers that are used to prevent an inadvertent trigger signal from locking in the LED prior to a catch attempt. Specifically, this allows the athlete to run with fists closed without latching the indicator, then to open his or her hands and thereby enable the latch circuit for the reception. The components may be designed to be water resistant, and capable of withstanding a short force of at least 1G. When augmented into the athletes training program, the invention is expected to enhance the ability of the athlete to receive and control a thrown football, basketball or similar items.

The first step in the design process was the sensor selection. The sensors would have to be capable of being fitted into a glove and powered from a small DC battery, such as (for example) a 6 volt camera battery, which is contained within the housing. Therefore the need for minimal power consumption was essential. Although other sensors may be acceptable, the Tekscan Flexiforce A-101 force sensor was chosen for the palm pressure sensor due to its compact size (14 mm) and profile(0.13 mm). Similarly, the FLX-01 flex sensor from Images Company was chosen to detect finger flexion for the bypass circuit, although other sensors may work as well or better. Again, this was primarily due to the sensor simplicity and low profile (0.508 mm).

The circuit housing was then chosen in order to provide water and shock resistant capability as well as compact size. Although other housing may work equally as well, an Aquatech shock resistant stopwatch was selected and the internals machined to provide space for battery posts, a component board, and circuit components.

The design then turned to the circuit components required to interface between the sensors and the LED indicator, with primary focus on the power and space limitations. A latch for the LED was necessary and the DM74LS75N, a Quad D-Latch (with enable) was chosen, although others might be used as well. The 74LS75N was capable of being configured to provide an inhibit capability necessary for the bypass circuit.

An operational amplifier comparator was used to convert the analog sensor signal to a digital signal for the flip-flop. By establishing a voltage divider reference value at the negative input, an on-off signal could be achieved by using the LM358N amplifier. This amplifier does not require a positive and negative supply voltage, which makes it suitable for the invention's single source. The reference value for comparator for the palm pressure sensor is taken from the wiper of a 1 megohm trim potentiometer. One megohm was chosen to ensure that a minimal load was placed on the batter (6 microamps) and sufficiently large current was available to supply the input bias current (250 nanoamps). The trim-pot would allow fine sensitivity control of the pressure trigger level for different users.

The comparator for the flex sensor, used for the bypass circuit, has a simple voltage divider that provides the reference level. No adjust is needed because the degree of bend as the athlete closes his fist is not relative to hand size and was experimentally determined to equate to about ninety degrees (90°). Although finger flexion is usually measured at the knuckle where the finger connects to the hand, flexion may be gauged from other reference points such as the middle or end knuckle of a finger.

Once the latched output was developed, it was necessary to buffer the flip-flop from the LED indicator since the flip-flop output (8ma max) is not designed to drive the LED (10–30 ma@2 V). Once again, due to the restricted space, a comparator was used with a reference voltage of 1 volt. A current limiting resistor was installed to limit the LED current to 10 ma, when energized, to minimize power consumption.

Connecting the circuit involves arranging the components on the breadboard so that they will physically fit, and then soldering or otherwise binding the components into place.

The electrical circuit was fabricated on a breadboard and bench-tested for proper operation with the pressure and flex sensors. The desired reference voltage for the bypass circuit was determined to be 4.2 volts based upon a cumulative bend angle considered to be about ninety degrees (90°) for finger closure. The reference voltage for the pressure trigger level was set at 2.16 volts based on experimental finger-touch sensitivity.

After the circuit was tested satisfactorily, the stitching was removed from an Adidas receiver glove in order to install the sensors. The flex sensors were inserted into fabric sleeves after the sleeves were mounted between the fabric layers of the glove, in order to prevent snagging on the coarse glove material when the fingers are contracted and then extended. The fabric sleeves were first stitched into the backhand side of the glove's finger channels, and down the backhand portion of the glove (to the extent necessary to accommodate the flex sensor and possibly the leads); each flex sensor was then glued inside the respective sleeve. The glove fingers were then stitched back together.

For the four palm pressure sensors, four pennies were then machined to less than 1 mm thick, and each sensors was bonded to a penny in order to provide support for the sensor.

This was necessary to prevent damage to the pliable sensor and to prevent inadvertent trigger signals due to normal flexion and creasing of the palm of the glove. Holes were drilled into the machined substrate to allow stitching between the fabric layers of the palm of the glove. The pressure sensors were glued to a fabric layer and then stitched into the palm of the glove. All lead terminators for the flex and pressure sensors were routed to the inside backhand of the glove where they were connected electrically, protected with heat shrink, then glued and stitched between protective foam pads. Finally, the glove was stitched back together and turned right side out.

Palm Pressure Sensor Circuit

Figure 5:
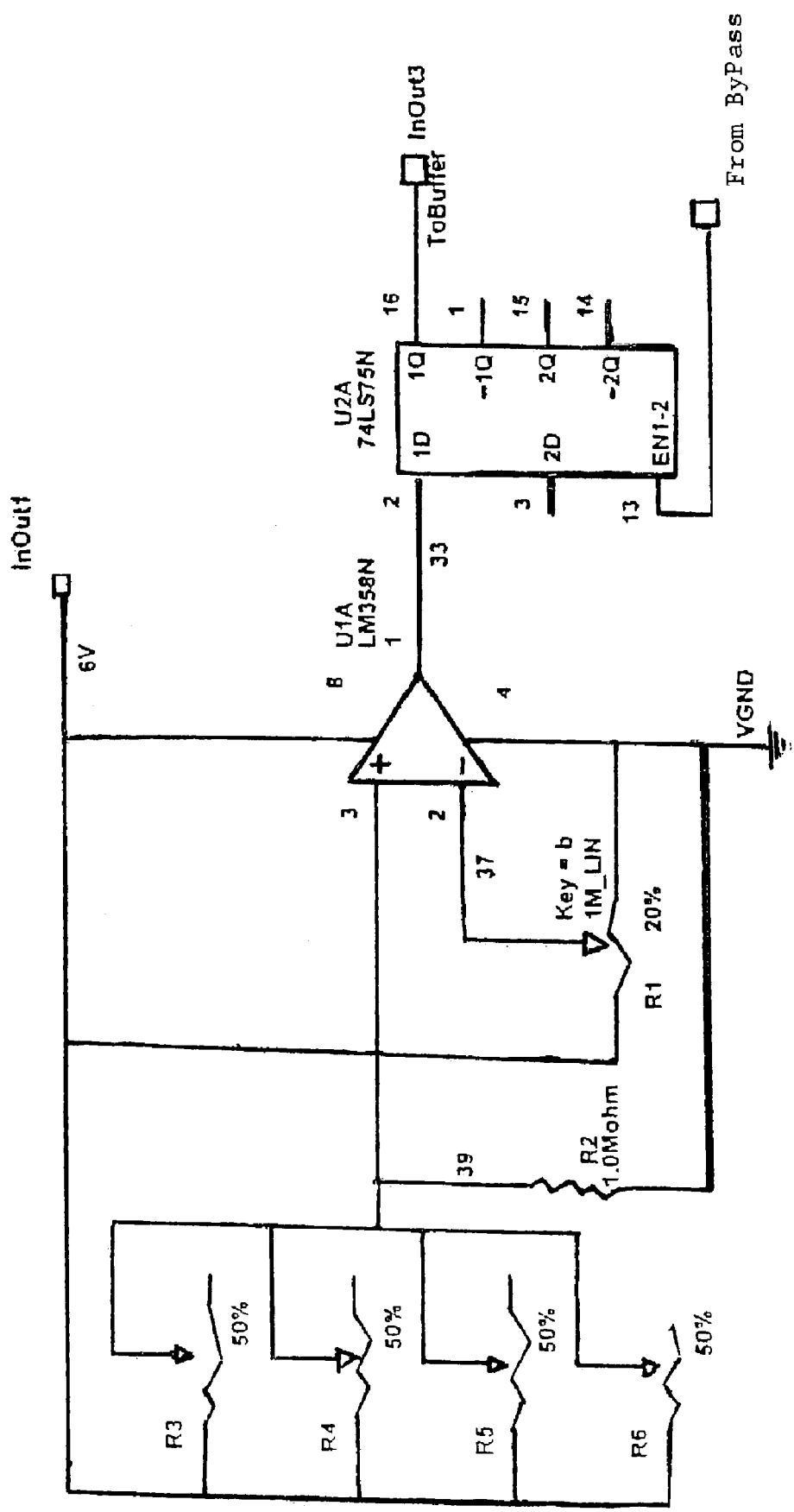
FIG. 5 is a diagram of one version of a palm pressure sensor trigger circuit of the invention.

In one version of the invention, the palm pressure circuit includes four (4) external force pressure sensors (R3–R6) embedded in the palm of the glove, an operational amplifier comparator (U1A), a 1 Megohm trim potentiometer (R1), a D flip-flop (U2A), and a voltage division resistor (R2). The pressure sensor is a laminated layer of pressure-sensitive ink embedded between two conductive silver layers. With no load applied to the sensor, the conductive ink layer appears as an open circuit. When a load is applied, the resistance of the ink layer decreases proportionally with the amount of stress. The sensors are connected in parallel, and receive power from the positive source; they are connected to the positive input of op-amp comparator (U1A). The negative input of U1A is taken from the wiper of the potentiometer (R1), which is used to set the sensitivity for the invention. FIG. 5 is a diagram of the palm pressure circuit.

When pressure is applied to one of the palm pressure sensors, the voltage signal to U1A increases at the voltage divider R2 junction with the positive input. Once the signal exceeds the threshold level determined by R1, the output of U1A transitions from 0 volts to approximately 4.7 volts. The comparator output is applied to the D flip-flop input (1D) of U2A and, with the enable active high, the output (1Q) transitions to high.

Finger Flex Sensor Bypass Circuit

The finger flex sensor bypass circuit may use one or more FLX-01 flex sensors from Images Company. Again, this was primarily due to the sensor simplicity and low profile (0.508 mm).

Figure 6:
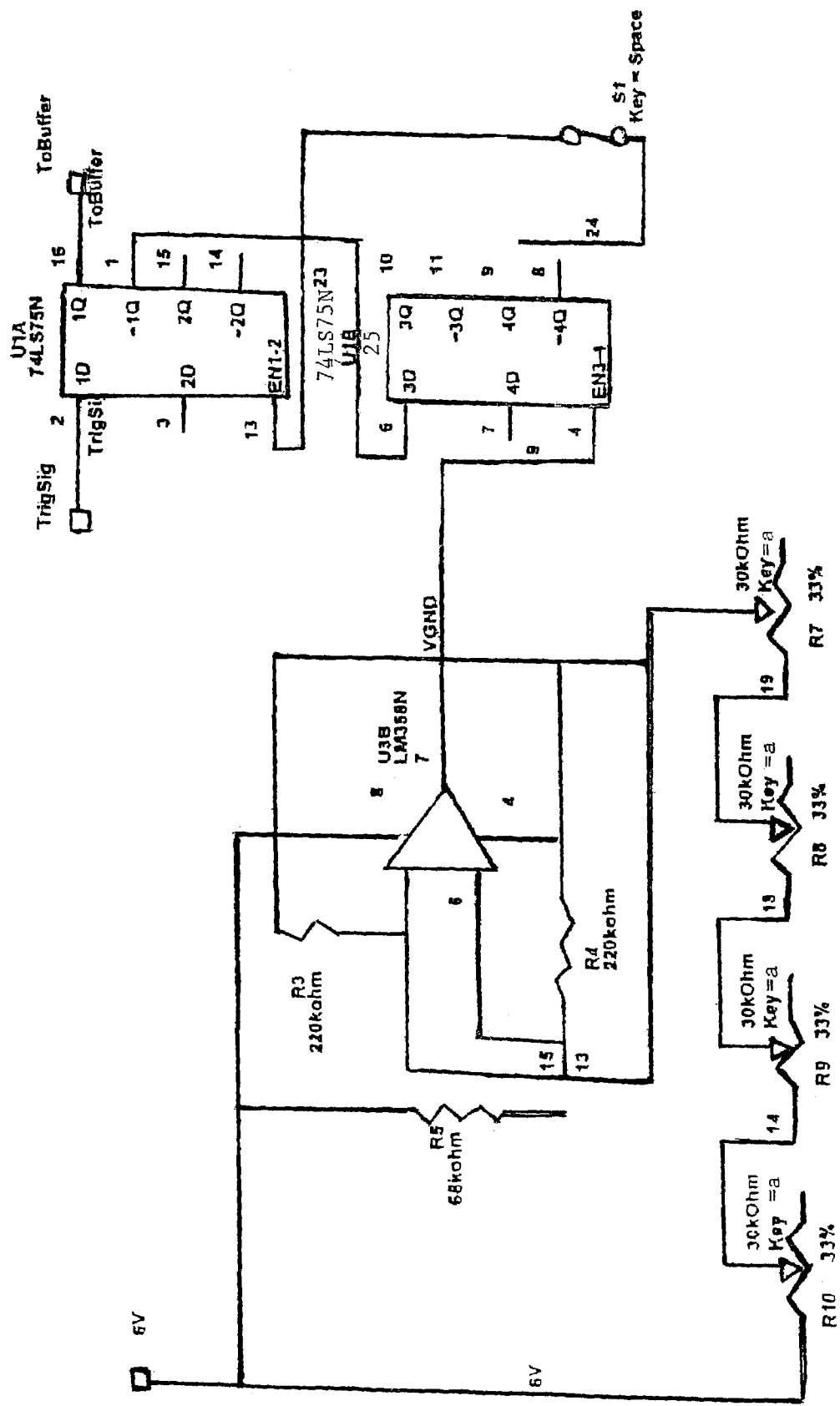
FIG. 6 is a diagram of one version of a finger flex sensor circuit of the invention.

In one version of the invention, the bypass logic circuit may include four (4) external finger flex sensors (R7–R10) embedded in the fingers of the glove, an op-amp comparator (U3B), D flip-flops (U1A & B), and resistors (R3, R4 and R5). The flex sensors are 4.5 inches long, laminated members impregnated with conductive ink. As the sensor is flexed from its normally straight position, with a typical resistance of 12 k ohms, the separation of the ink molecules increases and thereby results in decreased conductivity through the sensor. The reduced conductivity corresponds to an increased resistance of, typically, 30 k ohms. FIG. 6 is a diagram of the finger flex sensor circuit.

The negative input of bypass op-amp comparator (U3B) is held at 4.2 volts by the voltage dividers R4 and R5. The voltage divider including R3 and the flex sensors R7–R10 provide an input voltage to op-amp comparator (U3B) ranging from about 4.9 volts (unflexed) to about 3.7 volts (flexed to at least 90°). When the combined sensor flex stress causes the positive input to U3B to drop below the reference value applied to the negative input, the comparator output transitions from 4.72 volts to 0 volt. The low output from U3B disables the flip-flop (U1B), thereby latching the output Q2 as the enable signal to the trigger circuits op-amp comparator (U1A). The enable signal for U1A is taken from ~Q1, through U1B. The event sequence for normal and bypass operation is:

1. Normal Operation (Hands Open):
    a. With fingers extended straight, U3B output is high, enabling 3Q to follow 3D.
    b. With impact pressure on the palm, U1A output goes high, creating logic level high at 1D.
    c. With enable (En1) high, 1Q goes high and ~1Q goes low.
    d. With ~Q1 goes low, 3D goes low, and 3Q goes low.
    e. With 3Q low, En1 goes low, latching in the high output at 1Q.

In other words, the latch switch is enabled until the fingers are flexed to the point of exerting fingertip pressure against a palm pressure sensor, and such enablement allows activation along the entire palm pressure sensor circuit, if palm pressure occurs, resulting in empowerment of the LED.

2. Bypass Operation (Hands Closed into Fist):
    a. If ~1Q is high, then 3D, 3Q, and En1 are high.
    b. With fingers curled into a fist, U3B output is low, disabling U1B and latching 3Q high.
    c. 3Q latched high, latches En1 high.
    d. With En1 high, 1Q will follow 1D, but will not latch, preventing inadvertent indications by the LED that an improper catch was made.
    e. If ~1Q is low, then 3D, 3Q and En1 are low, latching 1Q high.
    f. With fingers curled, U3B output is low, disabling U1B and latching 3Q low.
    g. 3Q latched low ensures 1Q remains high.

In other words, the latch switch is disabled when the finger(s) flexion goes to the point of exerting fingertip pressure against a palm pressure sensor, and such disablement prevents empowerment of the LED.

Indicator and Buffer Circuit

The buffer and indicator circuit may include a comparator U2A, R1, R2, R6 and LED1. R2 and R6 form a voltage divider that maintains 1 volt on the negative input to U3A. When an impact signal drives 1Q high level is applied to the positive input of U3A, which causes the output of U3A to transition from 0 volt to approximately 4.3 volts. LED1 is then energized with a voltage drop of 2 volts. R1 is a current limiting resistor that drops the remaining voltage from U3A.

Aside from the apparatus described above for assisting the user to develop skills to catch a thrown object with fingers rather than palms, the invention disclosed herein also includes a method of using such an apparatus. Such a method includes the steps of providing the user with an apparatus described above, and providing said thrown object for catching by the user.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

We claim:

1. An apparatus for sensing lack of palm pressure for assisting in training the user to catch an object with fingers rather than palms, comprising a means for sensing palm pressure exerted against the user's palm, a means for bypassing said palm pressure sensing means when at least one of the user's fingers is flexed sufficiently inwardly toward the palm to cause exertion of pressure thereon, and a means for indicating when non-bypassed palm pressure occurs, thereby providing the training technique for catching an object with fingers to the user.

2. An apparatus described in claim 1, said bypass means comprising a finger flex sensor means.

3. An apparatus described in claim 2, said finger flex sensor means comprising electrical circuitry initially activated until finger flexion exceeding a desired level is sensed by said finger flex sensor means.

4. An apparatus described in claim 2, said finger flex sensor means comprising a flexible unflexed-activated circuit of ink, the flexing of which causing sufficient dispersion of said ink to reduce said activation below a desired level.

5. An apparatus described in claim 2, said finger flex sensor means comprising a layer of flexible insulative material having a circuit of electrically conductive ink, the flexing of which causing sufficient dispersion of said ink to reduce said electrical current.

6. An apparatus described in claim 2, comprising initially-activated circuitry extending from an electrical power source along said finger flex sensor, through a comparator, and through a bypass switch juncture capable of deactivating a palm pressure sensor circuit between said palm pressure sensing means and said indicator means.

7. An apparatus described in claim 6, wherein said electrical power source inputs about 6 volts of electrical current into said finger flex sensor which, when flexed at least a desired flexion amount, reduces output to below 3.7 volts into said comparator, which outputs no significant voltage into said bypass switch thereby deactivating said palm pressure sensing circuit.

8. An apparatus described in claim 6, said indicator means comprising an LED display empowered by input from said palm pressure sensor circuit.

9. An apparatus described in claim 8, further comprising means for automatically resetting said apparatus after a desired duration following an LED display empowerment.

10. An apparatus described in claim 9, further comprising means for remembering the number of said LED display empowerments in each successive duration of use.

11. An apparatus described in claim 2, said finger flex sensor means disabling a bypass switch upon finger flexion beyond a desired level.

12. An apparatus described in claim 2, wherein said finger flex sensor means comprises conductive ink.

13. An apparatus described in claim 1, said palm pressure sensing means comprising an initially-deactivated palm pressure sensor that activates upon the application of pressure.

14. An apparatus described in claim 13, said palm pressure sensor comprising two layers of conductive material separated by pressure sensitive electrically insulative material, the palm pressure causing said insulative material to disperse and cause increased conductivity.

15. An apparatus described in claim 13, said palm pressure sensor comprising a palm pressure sensor circuit comprising initially-deactivated circuitry extending from an electric power source along said palm pressure sensor, through a comparator, through a bypass switch juncture and to said indicator means.

16. An apparatus described in claim 15, wherein said electrical power source inputs about 6 volts of electrical current into said initially-deactivated palm pressure sensor which, when pressured at least a desired pressure amount, activates output of about 4.5 volts into said comparator, which outputs about 4.7 volts into said bypass switch juncture which, if enabled, outputs about 4.7 volts to said indicator means.

17. An apparatus described in claim 1, wherein said palm pressure sensor means comprises pressure sensitive insulative ink separating layers of conductive materials.

18. An apparatus described in claim 1, further comprising means for entering a power saving mode of operation, thereby automatically reducing operational power availability to the extent not required for substantial periods of non-use.

19. An apparatus for sensing lack of palm pressure for assisting in training the user to catch an object with fingers rather than palms, comprising:
   a. means for sensing pressure exerted against the user's palm, comprising a palm pressure sensor circuit comprising initially-deactivated circuitry extending from an electrical power source along a palm pressure sensor comprising two layers of conductive material separated by pressure sensitive electrically insulative material, said circuitry continuing through a comparator, through a bypass switch juncture capable of deactivating said palm pressure sensor circuit, and to means for indicating when non-bypassed palm pressure occurs; and
   b. means for deactivating said palm pressure sensor circuit, said deactivating means comprising initially-activated circuitry extending from said electrical power source along a finger flex sensor means comprising a layer of flexible insulative material having a circuit of electrically conductive ink, said circuitry continuing through a comparator, and through said bypass switch juncture.

20. A method of using an apparatus for sensing lack of palm pressure for assisting in training the user to catch an object with fingers rather than palms, comprising the steps of providing the user with an apparatus including a means for sensing palm pressure exerted against the user's palm a means for bypassing said palm pressure sensing means when at least one of the user's fingers is flexed sufficiently inwardly toward the palm to cause exertion of pressure thereon, and a means for indicating when non-bypassed palm pressure occurs, then projecting said object for catching by the user.

* * * * *

UNITED STATES PATENT AND TRADEMARK OFFICE
Certificate

Patent No. 7,008,231 B2          Patented: March 7, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Patrick Pesnell, Little Rock, AR (US); Glenn Erskine, Granbury, TX (US); and Lance Strother, Broussard, LA (US).

Signed and Sealed this Twenty-seventh Day of October 2009.

XUAN THAI
*Supervisory Patent Examiner*
Art Unit 3715